Feb. 28, 1967   L. CIAMPI   3,306,260
ANIMAL FEEDING DEVICE
Filed Sept. 2, 1965
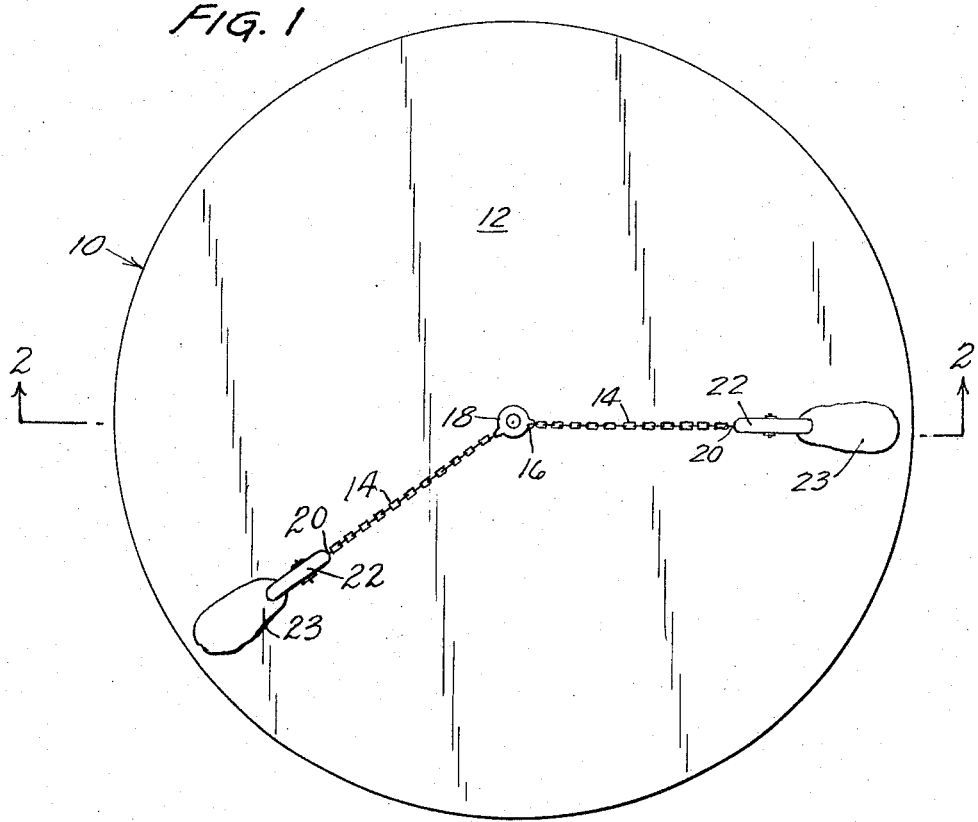
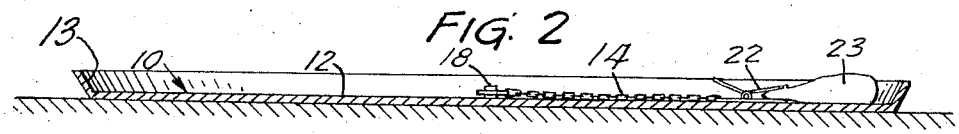
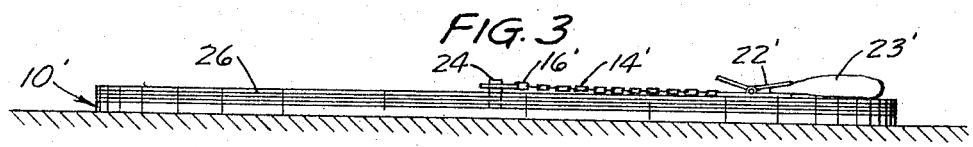
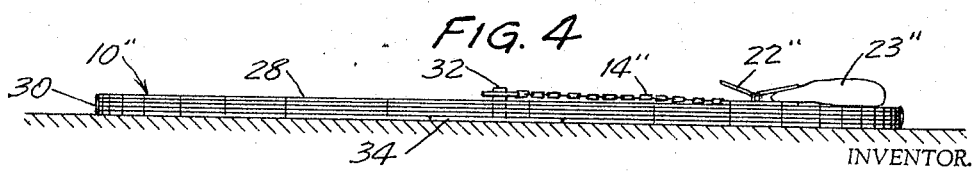
INVENTOR.
LEDO CIAMPI
BY John W. Klooster
ATTORNEY 3,306,260
ANIMAL FEEDING DEVICE
Ledo Ciampi, 448 White Bear Ave.,
St. Paul, Minn. 55106
Filed Sept. 2, 1965, Ser. No. 484,626
8 Claims. (Cl. 119—51)

This invention relates to animal feeding devices. More particularly, this invention is directed to feeding devices adapted for the feeding of solid and semi-solid foods to animals in such a way as to keep underlying surfaces free from the debris characteristically associated with animal feeding.

Heretofore, the art has known of animal feeding devices created for a similar purpose, but, so far as is known to me, none has been available which substantially anchors solid or semi-sold food being eaten in such a way as to retain same over or on an underlying base member during an entire feeding operation. Thus, U.S. Patent No. 2,813,509 describes an animal feeding device wherein a bowl is fixed centrally on a flat supporting mat or base member, but solid food placed in the bowl can be removed therefrom by a feeding animal to a location beyond the supporting mat thereby not only littering a floor and surroundings but also contaminating the food. By the present invention, such shortcomings of the prior art are avoided.

Accordingly, it is an object of the present invention to provide an animal feeding device suitable for feeding solid or semi-solid foodstuffs such as meat, biscuits, bones, or the like to animals, such as cats, dogs, and the like, so that such foodstuffs are not removed from the location of the feeding device, so that cluttering, soiling, contaminating, or the like of dwelling floor surfaces is prevented or minimized, and so that such foodstuffs are held in a convenient position for a feeding animal.

Another object is to provide a sanitary feeding device for animals.

Another object of the present invention is to provide a feeding device of the class indicated wherein the surface of the base member beneath the foodstuff is constructed of a disposable sheet-like member which may be removed following a feeding operation.

Another object is to provide a feeding device of the class indicated wherein there are a plurality of such sheet-like members stacked in deck or pad fashion with optional binding means to maintain the stacked relationship during feeding operation.

Another object is to provide a feeding device of the class indicated wherein there are a plurality of strand members each secured to the base member and each adapted to clamp a separate such foodstuff.

Another object is to provide a feeding device of the class indicated which is also suitable for holding animal toys for animal playing or the like.

Another object is to provide a feeding device of the class indicated which will tend to adhere by suction to a smooth surface, such as a floor, when urged away therefrom by a force applied to the central portion of the base member.

Other and further objects and advantages of the present invention will become apparent to those skilled in the art from the following description taken together with the associated drawings wherein:

FIGURE 1 is a plan view of one embodiment of an animal feeding device of the present invention;

FIGURE 2 is a vertical sectional view taken along the line 2—2 of FIGURE 1 showing an upturned rim portion added;

FIGURE 3 is a view similar to FIGURE 2 but showing an alternative embodiment of the present invention; and FIGURE 4 is a view similar to FIGURE 2 but showing another alternative embodiment of the present invention.

Turning to the drawings there is seen in FIGURE 1 an embodiment of the device of the invention which is herein referred to in its entirety by the numeral 10. Device 10 is seen to include a solid, generally disk-shaped base member or support mat 12 constructed of a material such as sheet plastic, rubber, or the like. Base member 12 preferably has a flat undersurface so as to adapt same to rest upon a smooth supporting surface such as a floor. Though the base member 12 is depicted here as being circular in edge dimensions, it may be of any shape desired. Also, while base member 12 is shown here to be essentially flat on its upper surface, it will be appreciated that such base member 12 can have integrally formed therewith an upstanding edge or upturned rim portion 13 extending about its edge portions.

On the upper surface of base member 12 is a flexible, substantially inelastic strand member 14 which can be conveniently constructed of a material such as wire, string, light chain, leather, plastic, or the like. One end 16 of strand member 14 is secured to a generally central location on the base member 12 by securing means 18. Securing means 18 can conveniently comprise any convenient assembly, such as a riveted eye, etc., as those skilled in the art will appreciate. Preferably, the securing means employed permits the end 16 of strand member 14 to pivot.

To the opposite end 20 of strand member 14 is secured a clamp means 22, such as a noose, a screw-type clamp, a clamp which is biased into a normally closed position (commonly known to the art as a battery clamp), or the like. As those skilled in the art will appreciate, any convenient clamp means can be employed. The strand member 14 has a length such that the clamp means 22 has its jaws located substantially entirely on the surface of base member 12. Within the clamp means 22 can be positioned or mounted a solid or semi-solid foodstuff 23 for purposes of feeding an animal. Obviously two or more strand members 14 with clamp means 22 may be attached to the securing means 18.

When the base member 12 has a flat undersurface and is substantially circular, and when the securing means 18 is secured approximately at the center thereof, a useful and preferred construction results because, when an animal tugs in a vertical direction upon a foodstuff 23 secured in a clamp means 22, the base member 12 tends to adhere by suction to a smooth surface, such as a floor, so that the entire device 10 tends to remain located in a prechosen position. An animal's front feet positioned on base member 12 tend to stabilize device 10 against lateral sliding movements. Optionally, device 10 can be fixed in a stationary position to a floor or the like, as described.

One alternative embodiment of the invention is seen in FIGURE 3. In this embodiment, elements similar to those found in the embodiment described in FIGURES 1 and 2 are identified with similar numbers but with prime marks added thereto. This embodiment employs a securing means 24 which has a center post which is adapted to position the end 16' of strand member 14' in spaced relationship to the surface of base member 12', so that a plurality of disposable sheet-like members 26 (which can be conveniently constructed of paper, plastic, or the like and preferably of a water and oil resistant sheet material) may be positioned in pad or deck fashion on the surface of the base member 12 beneath the strand member 14'. Then, after a feeding operation, a soiled individual sheet member 26 may be removed and discarded. Of course, individual sheet members 26 may be used with a construction such as that shown in FIGURES 1 and 2 if desired.

Another embodiment of the invention is shown in FIGURE 4. In this embodiment elements similar to those found in the embodiment described in FIGURES 1 and 2 are identified with similar numbers but with double prime marks added thereto. This embodiment uses a stack 28 of sheet members to comprise a base member for a feeding device 10″. To hold the sheets in alignment with one another, binding means, such as a conventional gum backing material 30 is optionally intermittently applied at periodic intervals circumferentially about the stack 28 of sheet members. Also, a securing means 32 is used which includes an enlarged washer-like member 43 on the bottom to prevent forces applied to clamp 22″ from pulling the securing means 32 away from the plurality of sheet members 28. In this embodiment, when the sheet members are consumed, one can replace same with a new pack of sheet members.

It will be appreciated that in the foregoing embodiments more than one strand member and associated clamp means can be secured to a single securing means. Also, a plurality of separate securing means can be used with a single base member.

Exact size of a device of the invention will, of course, vary, depending upon such variables as convenience, animals to be fed, costs, etc.

While the present invention has been described by reference to various specific embodiments, it will be appreciated that further embodiments and modifications thereof are possible without departing from the invention's spirit and scope.

What is claimed is:
1. An animal feeding device comprising:
(a) a solid base member;
(b) a flexible, substantially inelastic strand member;
(c) securing means fastening one end of said strand member in a generally central location on one face of said base member;
(d) food clamp means secured to the other end of said strand member and adapted to hold a solid body; and
(e) said strand member having a length such that said clamp means is located substantially within the perimeter when on the face of said base member during limits of movement of said strand member about said securing means.

2. The device of claim 1 wherein said base member is generally disk shaped.

3. The device of claim 1 wherein said base member has a plurality of sheet-like members positioned on said one face below said strand member.

4. The device of claim 1 wherein said base member comprises a plurality of sheet members.

5. The device of claim 1 wherein said securing means includes swivel means permitting said strand member to revolve around said securing means.

6. The device of claim 1 wherein said clamp means is spring biased into a normally closed position.

7. The device of claim 1 wherein a plurality of said strand members, each with a separate clamp means, are fastened to said securing means.

8. The device of claim 1 wherein said solid base member has an upturned rim portion on its perimeter.

References Cited by the Examiner

UNITED STATES PATENTS

| | | | |
|---|---|---|---|
| 1,309,036 | 7/1919 | Knight | 43—96 |
| 1,550,438 | 8/1925 | Hohmann | 119—70 |
| 1,699,308 | 1/1929 | Postings | 119—29 |
| 1,942,287 | 1/1934 | Heitz | 154—43 |
| 2,726,479 | 12/1955 | Huse | 43—100 |
| 2,813,509 | 11/1957 | Bruno | 119—51 |
| 3,147,739 | 9/1964 | Shaheen | 119—61 X |
| 3,176,427 | 4/1965 | Hershey | 43—100 |

FOREIGN PATENTS 289,757   1/1916   Germany.

SAMUEL KOREN, *Primary Examiner.*

ALDRICH F. MEDBERY, *Examiner.*